US012689483B2

(12) United States Patent
Mei et al.

(10) Patent No.: US 12,689,483 B2
(45) Date of Patent: Jul. 21, 2026

(54) DEMODULATION REFERENCE SIGNAL CONFIGURATION AND INDICATION SCHEMES

(71) Applicant: ZTE Corporation, Shenzhen (CN)

(72) Inventors: Meng Mei, Shenzhen (CN); Shujuan Zhang, Shenzhen (CN); Bo Gao, Shenzhen (CN); Zhaohua Lu, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 360 days.

(21) Appl. No.: 18/522,151

(22) Filed: Nov. 28, 2023

(65) Prior Publication Data

US 2024/0163057 A1    May 16, 2024

Related U.S. Application Data

(63) Continuation of application No. PCT/CN2022/078152, filed on Feb. 28, 2022.

(51) Int. Cl.
*H04L 5/00* (2006.01)
*H04W 72/12* (2023.01)

(52) U.S. Cl.
CPC .......... *H04L 5/0051* (2013.01); *H04L 5/0016* (2013.01); *H04W 72/12* (2013.01); *H04L 5/0007* (2013.01)

(58) Field of Classification Search
CPC ... H04L 5/0007; H04L 5/0016; H04L 5/0051; H04W 72/12; H04W 72/40; H04W 72/50; H04W 72/51; H04W 72/512
USPC ....................................................... 370/329
See application file for complete search history.

(56) References Cited

U.S. PATENT DOCUMENTS

| | | | | |
|---|---|---|---|---|
| 2012/0106374 A1* | 5/2012 | Gaal | ..................... | H04L 5/0048 370/252 |
| 2012/0120905 A1* | 5/2012 | Ko | ......................... | H04L 5/0094 370/479 |
| 2017/0264405 A1* | 9/2017 | Gao | ....................... | G16H 20/10 |
| 2019/0068308 A1* | 2/2019 | Shin | ...................... | H04L 5/0023 |
| 2020/0127786 A1* | 4/2020 | Kwak | ................... | H04L 27/261 |
| 2020/0343989 A1* | 10/2020 | Shin | ....................... | H04J 13/12 |

(Continued)

FOREIGN PATENT DOCUMENTS

| | | |
|---|---|---|
| CN | 113748633 A | 12/2021 |
| EP | 3591881 A1 | 1/2020 |
| WO | 2018174665 A1 | 9/2018 |

OTHER PUBLICATIONS

ETSI TS 138 214 v15.15.0 "5G; NR; Physical layer procedures for data (3GPP TS 38.214 version 15.15.0 Release 15)" Jan. 2022. (Year: 2022).*

(Continued)

*Primary Examiner* — Stephen J Clawson
(74) *Attorney, Agent, or Firm* — Perkins Coie LLP

(57) ABSTRACT

A method of wireless communication is described. The wireless communication method includes receiving, by a communication device, an antenna port indication; and determining, by the communication device, a first demodulation reference signal (DMRS) port based on the antenna port indication. The first DMRS port is mapped to two resource elements of one physical resource block on one OFDM (Orthogonal Frequency Division Multiplexing) symbol.

19 Claims, 19 Drawing Sheets

1500

Scheduling user devices to utilize a same time-frequency resource, each user device corresponding to a first type of a user device configured to operate according to a first antenna port configuration or a second type of a user device configured to operate according to a second antenna port configuration

1510

(56)                    References Cited

U.S. PATENT DOCUMENTS

2021/0258119  A1*    8/2021  Yoon ..................... H04L 5/0051
2022/0103325  A1     3/2022  Chen
2024/0163057  A1*    5/2024  Mei ...................... H04W 72/12
2025/0202651  A1*    6/2025  Zhang .............. H04W 72/1268

OTHER PUBLICATIONS

EPO, Extended European Search Report for European Application No. 22 927 818.9, mailed on Nov. 26, 2024, 12 pages.

Samsung, "Remaining details on DMRS," 3GPP TSG RAN WG1 NR#3, Nagoya, Japan, R1-1715967, Sep. 18-21, 2017, 10 pages.

International Search Report in International Application No. PCT/CN2022/078152, mailed on Sep. 28, 2022, 8 pages.

ITL, "Considerations on DMRS pattern for NR," 3GPP TSG RAN WG1 Meeting #89, R1-1708321, Hangzhou, China, May 15-19, 2017, 4 pages.

ITL, "Considerations on DMRS pattern design for NR," 3GPP TSG RAN WG1 Meeting #88-bis, R1-1705794, Spokane, USA, Apr. 3-7, 2017, 4 pages.

CATT, "Discussion on the RS PAPR issue," 3GPP TSG RAN WG1 Meeting #95, R1-1812638, Spokane, USA, Nov. 12-16, 2018, 5 pages.

Huawei et al., "Discussion on PAPR for CSI-RS and DMRS," 3GPP TSG RAN WG1 Meeting #95, R1-1812688, Spokane, USA, Nov. 12-16, 2018, 6 pages.

Intel Corporation, "Low PAPR Reference Signals," 3GPP TSG RAN WG1 Meeting #94bis, R1-1810793, Chengdu, China, Oct. 8-12, 2018, 11 pages.

* cited by examiner

Existing DMRS type 2, one front loaded DMRS symbol, 4 DMRS RE per port per symbol CDM group#2 in which port 4 and 5 are mapped CDM group#1 in which port 2 and 3 are mapped CDM group#0 in which port 0 and 1 are mapped CDM group#2 in which port 4 and 5 are mapped CDM group#1 in which port 2 and 3 are mapped CDM group#0 in which port 0 and 1 are mapped Symbol #n Existing DMRS type 2, two front loaded DMRS symbols,
4 DMRS RE per port per symbol CDM group#2 in which port 4, 5, 10, 11 are mapped CDM group#1 in which port 2, 3, 8, 9 are mapped CDM group#0 in which port 0, 1, 6, 7 are mapped CDM group#2 in which port 4, 5, 10, 11 are mapped CDM group#1 in which port 2, 3, 8, 9 are mapped CDM group#0 in which port 0, 1, 6, 7 are mapped

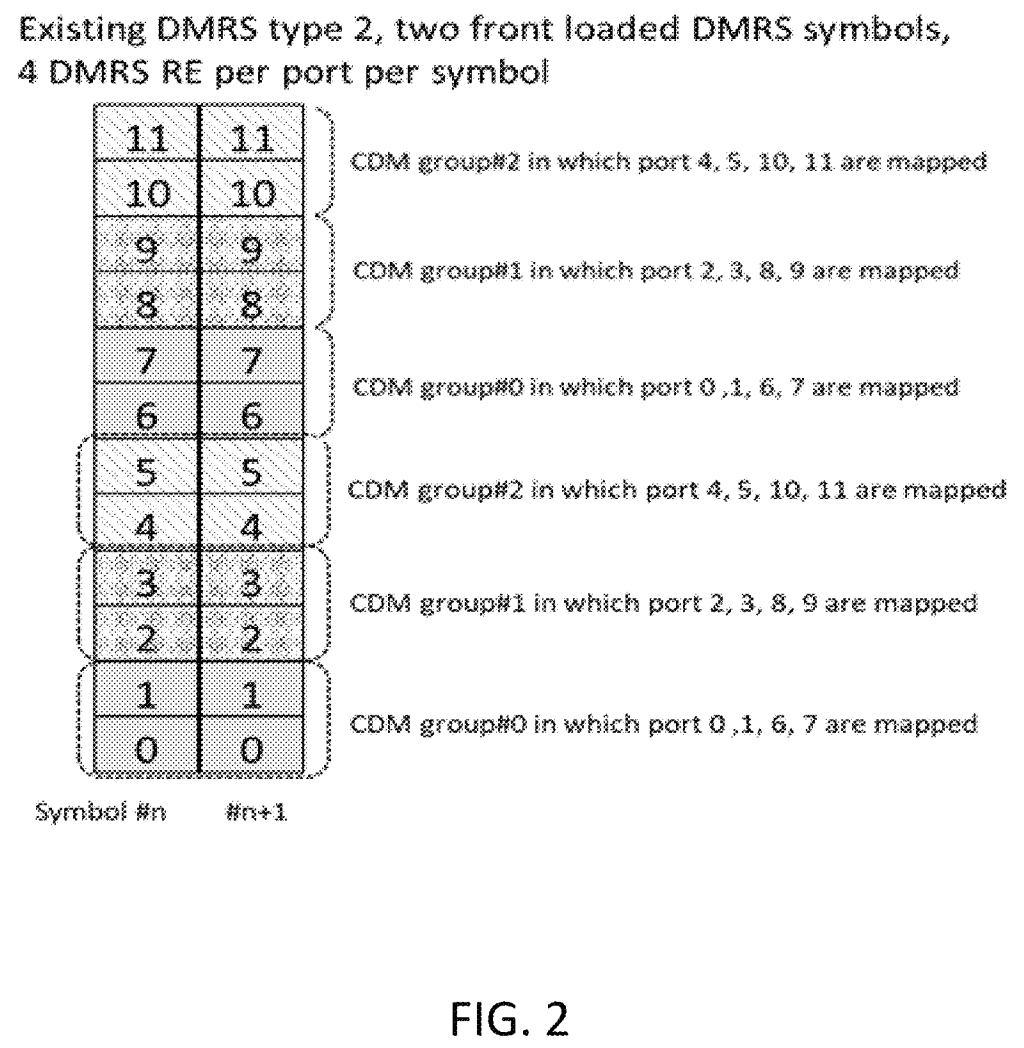

| Symbol #n | Symbol #n+1 |
|---|---|
| 11 | 11 |
| 10 | 10 |
| 9 | 9 |
| 8 | 8 |
| 7 | 7 |
| 6 | 6 |
| 5 | 5 |
| 4 | 4 |
| 3 | 3 |
| 2 | 2 |
| 1 | 1 |
| 0 | 0 |

FIG. 2

CDM group#5 in which port 16 and 17 are mapped

CDM group#4 in which port 14 and 15 are mapped

CDM group#3 in which port 12 and 13 are mapped

CDM group#2 in which port 4 and 5 are mapped

CDM group#1 in which port 2 and 3 are mapped

CDM group#0 in which port 0 and 1 are mapped

Symbol #n

Parameters for PUSCH DM-RS configuration type 2

FIG. 6

| new pattern | | | Port index | |
|---|---|---|---|---|
| | CDM unit0 CDM group 0 | FD-OCCL=2 CDM group 0 | 12, 13, 24, 25 | |
| | CDM unit0 CDM group 1 | FD-OCCL=2 CDM group 1 | 14, 15, 26, 27 | |
| | CDM unit0 CDM group 2 | FD-OCCL=2 CDM group 2 | 16, 17, 28, 29 | |
| | CDM unit1 FD-OCCL=2 CDM group 3 | | 18, 19, 30, 31 | |
| | CDM unit1 FD-OCCL=2 CDM group 4 | | 20, 21, 32, 33 | |
| | CDM unit1 FD-OCCL=2 CDM group 5 | | 22, 23, 34, 35 | |
| one PRB | | one OFDM symbol | | |

| Value | Number of DMRS CDM group(s) without data | DMRS port(s) |
|---|---|---|
| 0 | 1 | 12,13 |
| 1 | 2 | 12,13 |
| 2 | 2 | 14,15 |
| 3 | 3 | 12,13 |
| 4 | 3 | 14,15 |
| 5 | 3 | 16,17 |
| 6 | 2 | 12,14 |
| 7 | 4 | 12,13 |
| 8 | 4 | 14,15 |
| 9 | 4 | 16,17 |
| 10 | 4 | 18,19 |
| 11 | 5 | 12,13 |
| 12 | 5 | 14,15 |
| 13 | 5 | 16,17 |
| 14 | 5 | 18,19 |
| 15 | 5 | 20,21 |
| 16 | 6 | 12,13 |
| 17 | 6 | 14,15 |
| 18 | 6 | 16,17 |
| 19 | 6 | 18,19 |
| 20 | 6 | 20,21 |
| 21 | 6 | 22,23 |
| 22-31 | Reserved | Reserved |

FIG. 10

| Value | Number of DMRS CDM group(s) without data | DMRS port(s) |
|---|---|---|
| 0 | 1 | 0,1 |
| 1 | 2 | 0,1 |
| 2 | 2 | 2,3 |
| 3 | 3 | 0,1 |
| 4 | 3 | 2,3 |
| 5 | 3 | 4,5 |
| 6 | 2 | 0,2 |
| 7 | 1' | 0,1' |
| 8 | 2' | 0,1 |
| 9 | 2' | 2,3 |
| 10 | 3' | 0,1 |
| 11 | 3' | 2,3 |
| 12 | 3' | 4,5 |
| 13 | 2' | 0,2 |
| 14-15 | Reserved | Reserved |

FIG. 11

| Number of DM-RS CDM groups without data | DM-RS configuration type 1 | DM-RS configuration type 2 |
|---|---|---|
| 1 | 0 dB | 0 dB |
| 2 | -3 dB | -3 dB |
| 3 | -4.77 dB | -4.77 dB |
| 4 | -6dB | -6dB |
| 5 | -7dB | -7dB |
| 6 | -7.78dB | -7.78dB |

FIG. 12

| | CDM group 0 |
|---|---|
| | CDM group 1 |
| | CDM group 0 |
| | CDM group 1 |
| | CDM group 0 |
| | CDM group 1 |
| | CDM group 0 |
| | CDM group 1 |
| | CDM group 0 |
| | CDM group 1 |
| | CDM group 0 |
| one PRB | CDM group 1 |

OFDM 2

| CDM group 3 |
|---|
| CDM group 4 |
| CDM group 3 |
| CDM group 4 |
| CDM group 3 |
| CDM group 4 |
| CDM group 3 |
| CDM group 4 |
| CDM group 3 |
| CDM group 4 |
| CDM group 3 |
| CDM group 4 |

OFDM 6

Receiving, by a communication device, an antenna port indication

1420

Determining, by the communication device, a first demodulation reference signal (DMRS) port based on the antenna port indication

1500

1510

Scheduling user devices to utilize a same time-frequency resource, each user device corresponding to a first type of a user device configured to operate according to a first antenna port configuration or a second type of a user device configured to operate according to a second antenna port configuration

DEMODULATION REFERENCE SIGNAL CONFIGURATION AND INDICATION SCHEMES

CROSS-REFERENCE TO RELATED APPLICATIONS

This application is a continuation of International Patent Application No. PCT/CN2022/078152, filed on Feb. 28, 2022, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for feedback schemes for multiple channels in wireless communication devices.

In one aspect, a wireless communication method is disclosed. The wireless communication method includes receiving, by a communication device, an antenna port indication; and determining, by the communication device, a first demodulation reference signal (DMRS) port based on the antenna port indication. The first DMRS port is mapped to two resource elements of one physical resource block on one OFDM (Orthogonal Frequency Division Multiplexing) symbol.

In another aspect, a wireless communication method is disclosed. The wireless communication method includes scheduling user devices to utilize a same time-frequency resource, each user device corresponding to a first type of a user device configured to operate according to a first antenna port configuration or a second type of a user device configured to operate according to a second antenna port configuration. The first antenna port configuration maps an antenna port for one or more demodulation reference signals (DMRSs) to two resource elements of a physical resource block on a symbol and the second antenna port configuration maps the antenna port to at least 4 resource elements of the physical resource block on the symbol.

In another aspect, a communication apparatus comprising a processor configured to implement the above-described method is disclosed.

In another aspect, a computer readable medium having code stored thereon, the code, when executed, causing a processor to implement the above-described method is disclosed.

These, and other features, are described in the present document.

BRIEF DESCRIPTION OF THE DRAWING

FIG. 2 shows an example of a DMRS pattern for DMRS type 2 of one PRB (physical resource block) when two front loaded DMRS symbols are configured.

FIG. 6 shows an example of a table including parameters for PUSCH (physical uplink shared channel) DMRS configuration type 2 based on some implementations of the disclosed technology.

FIG. 7 shows an example of DMRS port indices for DMRS type 2 based on some implementations of the disclosed technology.

FIG. 8 shows an example of a table including parameters for PUSCH DMRS configuration type 1 based on some implementations of the disclosed technology.

FIG. 9 shows an example of DMRS port indices for DMRS type 1 based on some implementations of the disclosed technology.

FIG. 10 illustrates an example of a table showing a number of DMRS code division multiplexing (CDM) groups without data for DMRS type 2 for single symbol DMRS.

FIG. 11 illustrates an example of a table showing a number of DMRS CDM groups without data for DMRS type 2 for single symbol DMRS FIG. 12 illustrates an example of a table showing a ratio of PDSCH (physical downlink shared channel) energy per resource element (EPRE) to DMRS EPRE.

FIG. 13 shows an example of a TDM based DMRS configuration based on some implementations of the disclosed technology.

DETAILED DESCRIPTION

The disclosed technology provides implementations and examples of demodulation reference signal (DMRS) configuration and indication schemes.

Figure 1:
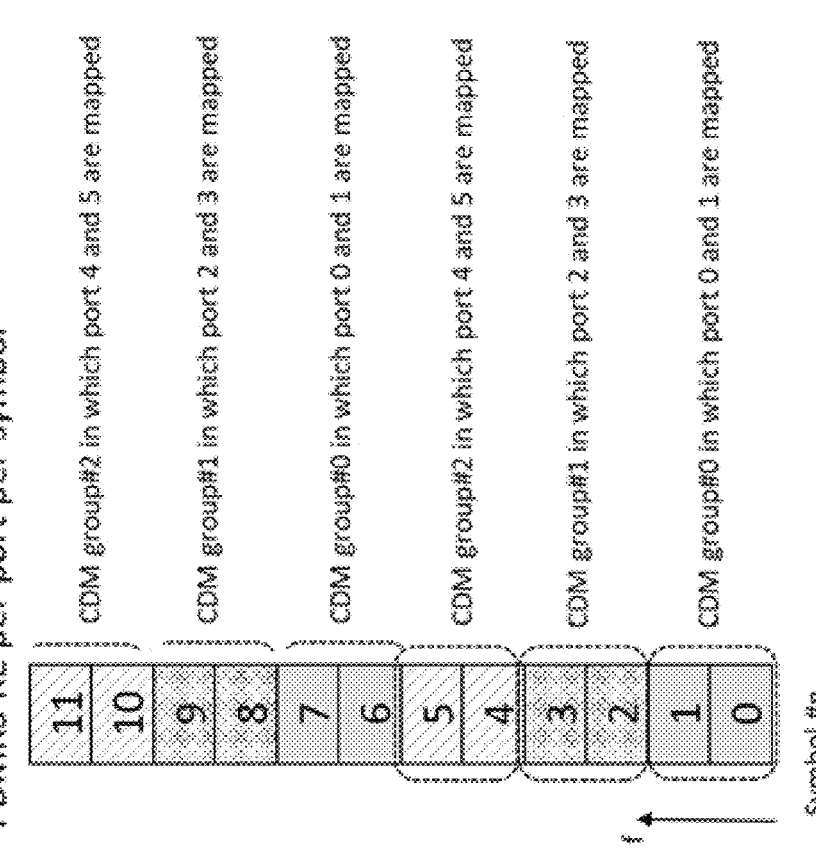
FIG. 1 shows an example of a DMRS pattern for DMRS type 2 of one PRB (physical resource block) when one front loaded DMRS symbol is configured.

In the initial releases of NR, two DMRS types are supported named as DMRS type 1 and DMRS type 2. FIG. 1 shows an example of a DMRS pattern for DMRS type 2 of one PRB (physical resource block) when one front loaded DMRS symbol is configured by RRC (radio resource control) signaling or indicated by DCI signaling. In FIG. 1, two adjacent frequency resource elements (REs) form one DMRS code division multiplexing (CDM) group. Two DMRS ports are included in the same CDM group. Specifically, DMRS port 0 and DMRS port 1 are multiplexed in CDM group #0 such that DMRS port 0 and DMRS port 1 are multiplexed in RE #0 and RE #1 in CDM manner and DMRS port 0 and DMRS port 1 are also multiplexed in RE #6 and RE #7 in CDM manner. Thus, CDM group #0 is repeated twice, i.e., in RE #0 and RE #1 for the first time and in RE #6 and #7 for the second time. In the example of FIG. 1, one DMRS port is mapped to four REs. For example, DMRS port 0 is mapped to CDM group 0 which repeats twice, i.e., in RE #0 and RE #1 and in RE #6, and RE #7. Thus, the DMRS port 0 Other DMRS ports can be mapped in a similar manner. For the case of one front loaded DMRS symbol as shown in FIG. 1, 6 DMRS ports (i.e., DMRS ports 0 to 5) are supported and the density of each DMRS port is 4 REs per PRB per symbol.

FIG. 2 shows an example of a DMRS pattern for DMRS type 2 of one PRB when two front loaded DMRS symbols are configured by RRC signaling or indicated by DCI signaling. In FIG. 2, four adjacent REs form one DMRS CDM group. Specifically, DMRS port 0, 1, 6 and 7 are multiplexed in CDM group #0 in CDM manner. Other DMRS ports can be mapped in a similarly manner. For the case of two front loaded DMRS symbols as shown in FIG. 2, 12 DMRS ports (i.e., DMRS ports 0 to 11) are supported and the density of each DMRS port is 8 REs per PRB per 2-symbols. It is noted that in one PRB, each CDM group maps twice, e.g. CDM group #0 maps on RE #0, #1 and also RE #6, #7.

Figure 3:
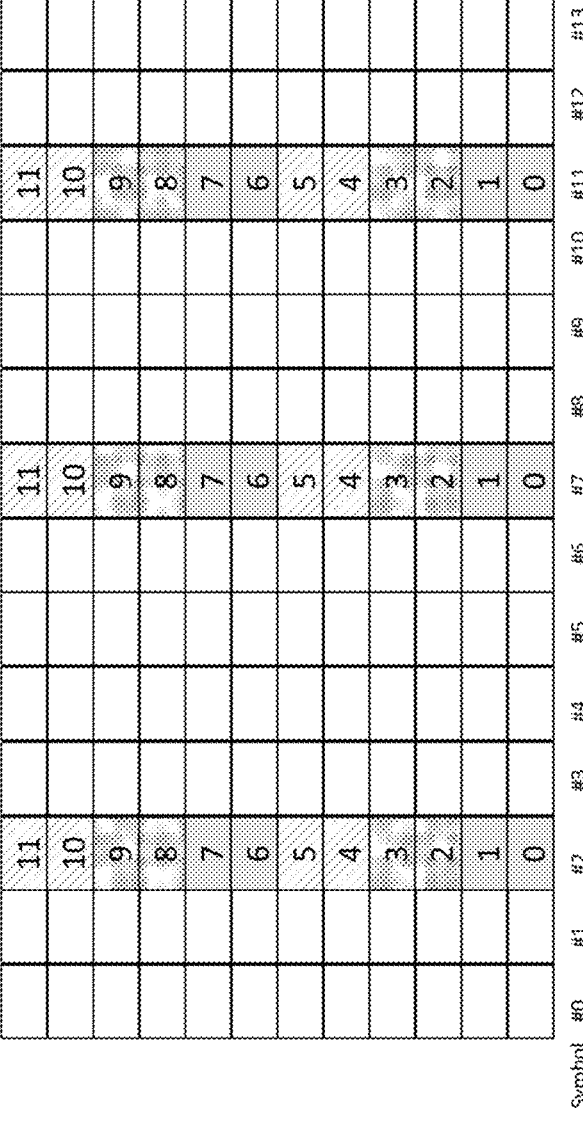
FIG. 3 shows an example of a mapping of DMRS ports in a slot of when one front loaded DMRS symbol is configured.

FIG. 3 shows an example of a mapping of DMRS ports in a slot when one front loaded DMRS symbol is configured. In FIG. 3, one front loaded DMRS symbols #2, #7 and #11 are configured in a slot. The one front loaded DMRS symbol corresponds to one as shown in FIG. 1.

In the current specifications, depending on the DMRS type, only 8 DMRS ports (for the DMRS type 1) or only 12 DMRS ports (for the DMRS type 2) are supported. With the development of wireless communication technologies, however, there are needs for more DMRS ports to be supported in the uplink and/or downlink transmission. To support more DMRS ports, e.g., more than 8 for the DMRS type 1 or more than 12 for the DMRS type 2, new DMRS pattern needs to be designed, and the DMRS ports need to accordingly indicated to UE.

Various implementations of the disclosed technology provide demodulation reference signal (DMRS) configurations and indication schemes to support more DMRS ports. How to support more DMRS ports are discussed in various implementations. In the descriptions below, two different types of the UE are mentioned, the first type of the UE corresponds to the legacy UE which is configured to have conventional DMRS patterns (as discussed with reference to FIGS. 1 and 3) and the second type of UE corresponds to the newly configured UE which is configured to have DMRS patterns suggested based on some implementations of the disclosed technology. The types of the UE (e.g., the first type of the UE and the second type of the UE) indicate whether a corresponding UE is the legacy UE having conventional DMRS patterns or the newly configured UE having DMRS patterns as suggested in this patent document. The types of the UE are distinguished from the DMRS types (e.g., DMRS type 1 or DMRS type 2) which indicate the frequency density of DMRS. DMRS type 1 defines six subcarriers per physical resource block (PRB) per antenna port, comprising alternate subcarriers. DMRS type 2 defines four subcarriers per PRB per antenna port, consisting of two groups of two consecutive subcarriers.

Various scenarios can be implemented based on some implementations of the disclosed technology, which include 1) a scenario that the newly configured UE is co-scheduled with another newly configured UE, 2) a scenario that the newly configured UE is co-scheduled with the legacy UE with the same DMRS pattern as that of the newly configured UE, 3) a scenario that the newly configured UE is co-scheduled with the legacy UE with DMRS ports mapped on non-overlapping REs. The co-scheduling of at least two UEs may refer to scheduling two UEs to share time-frequency resources.

Implementation 1

The present implementation discusses resource element mapping to support the example of DMRS patterns provided based on some implementations of the disclosed technology.

Figure 4A:
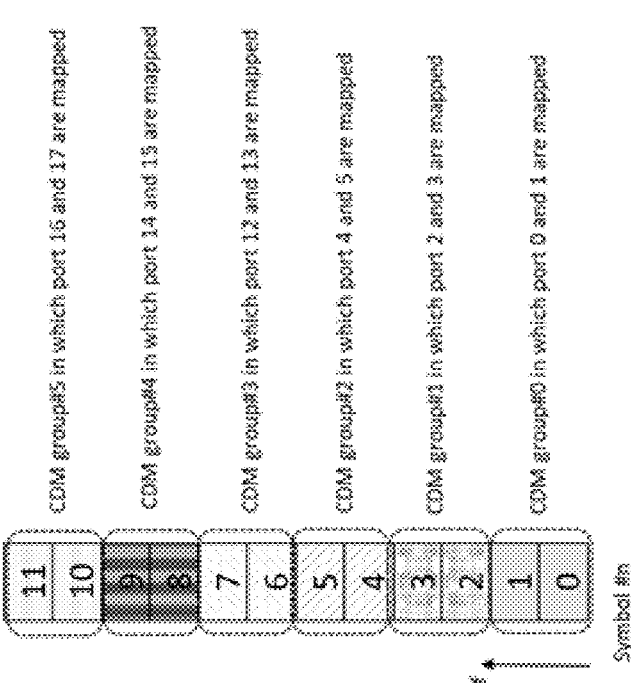
FIG. 4A shows an example of a DMRS pattern for DMRS type 2 of one PRB in the case of one front loaded DMRS symbol based on some implementations of the disclosed technology.

FIG. 4A shows an example of a DMRS pattern for DMRS type 2 of one PRB in the case of one front loaded DMRS symbol based on some implementations of the disclosed technology. Unlike the example as shown in FIG. 1 in which one DMRS port is mapped on 4 resource elements of one PRB on one OFDM symbol, in the implementation as shown in FIG. 4A, one DMRS port can be mapped on 2 resource elements of one PRB on one OFDM symbol. In some implementations, one DMRS port is mapped on two REs on one PRB with a frequency domain orthogonal cover code (OCC). In the example of FIG. 4A, one CDM group appears only once without any repetition. For example, the CDM group #0 is in RE #0 and RE #1, the CDM group #1 is in RE #2 and RE #3, the CDM group #2 is in RE #4 and RE #5, the CDM group #3 is in RE #6 and RE #7, the CDM group #4 is in RE #8 and RE #9, and the CDM group #5 is in RE #10 and RE #11. For example, the DMRS ports 0 and 1 are mapped on CDM group 0, the DMRS ports 2 and 3 are mapped on CDM group 1, the DMRS ports 4 and 5 are mapped on CDM group 2, the DMRS ports 6 and 7 are mapped on CDM group 3, the DMRS ports 8 and 9 are mapped on CDM group 4, and the DMRS ports 10 and 11 are mapped on CMD group 5. on RE #0 and RE #1 and the DMRS port 1 is mapped on RE #0 and RE #1. Thus, for the DMRS type 2, total 12 DMRS ports, i.e., DMRS port 0 to DMRS port 11, can be supported. Although the DMRS port indices from DMRS port 0 to DMRS port 11 are used in FIG. 4A, when the UE is co-scheduled with the legacy UE, the DMRS port indices may be modified. The modification of the DMRS port indices will be explained with reference to FIG. 7 which is described later in this patent document.

Figure 4B:
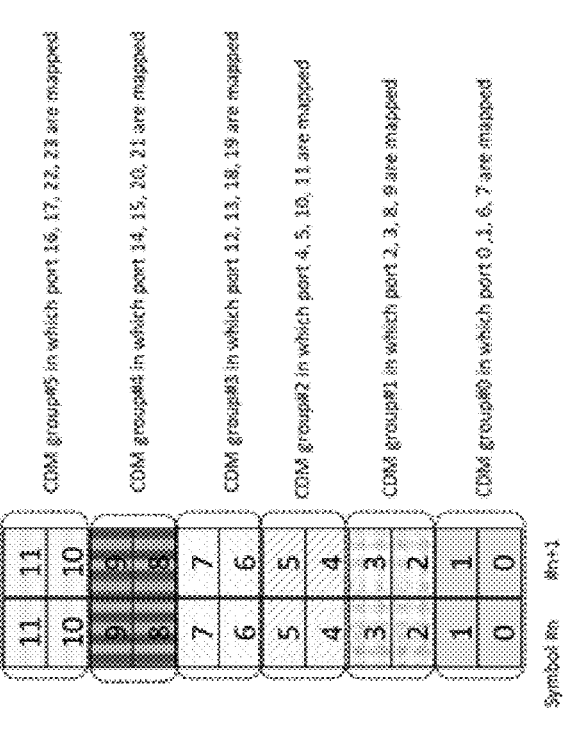
FIG. 4B shows an example of a DMRS pattern for DMRS type 2 of one PRB in the case of two front loaded DMRS symbols based on some implementations of the disclosed technology.

FIG. 4B shows an example of a DMRS pattern for DMRS type 2 of one PRB in the case of two front loaded DMRS symbols based on some implementations of the disclosed technology. In FIG. 4B, one CDM group appears only once without any repetition. For example, the CDM group #0 is in RE #0 and RE #1, the CDM group #1 is in RE #2 and RE #3, the CDM group #2 is in RE #4 and RE #5, the CDM group #3 is in RE #6 and RE #7, the CDM group #4 is in RE #8 and RE #9, and the CDM group #5 is in RE #10 and RE #11. For example, the DMRS ports 0, 1, 6, 7 are mapped on CDM group 0, the DMRS ports 2, 3, 8, 9 are mapped on CDM group 1, the DMRS ports 4, 5, 10, 11 are mapped on CDM group 2, the DMRS ports 12, 13, 18, 19 are mapped on CDM group 3, the DMRS ports 14, 15, 20, 21 are mapped on CDM group 4, and the DMRS ports 16, 17, 22, 23 are mapped on CMD group #5. Thus, for the DMRS type 2, total 24 DMRS ports, i.e., DMRS port 0 to DMRS port 23, can be supported. Although the DMRS port indices from DMRS port 0 to DMRS port 23 are used in FIG. 4A, when the UE is co-scheduled with the legacy UE, the DMRS port indices may be modified. The modification of the DMRS port indices will be explained with reference to FIG. 7 which is described later in this patent document.

In the example as shown in FIGS. 4A and 4B, DMRS port 0 is mapped on RE #0 and RE #1. In some implementations, when the DMRS port is mapped to two resource elements, the two resource elements are continuous in frequency domain for DMRS type 2. In some implementations, when the DMRS port is mapped to two resource elements, the two resource elements are comb in frequency domain for DMRS type 1 as shown in FIGS. 5A and 5B.

Figure 5A:
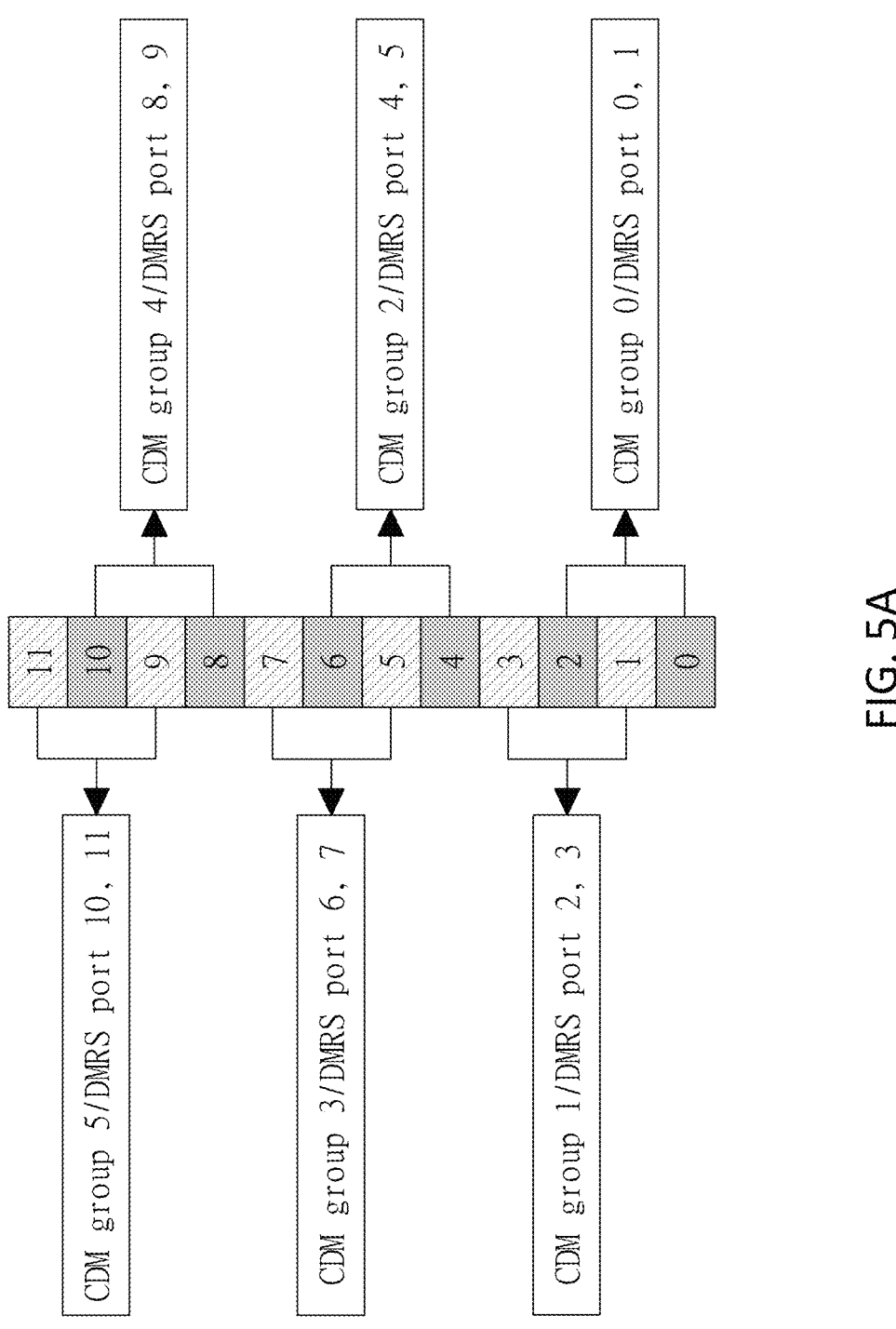
FIG. 5A shows an example of a DMRS pattern for DMRS type 1 of one PRB in the case of one front loaded DMRS symbol based on some implementations of the disclosed technology.

FIG. 5A shows an example of a DMRS pattern for DMRS type 1 of one PRB in the case of one front loaded DMRS symbol based on some implementations of the disclosed technology. In FIG. 5A, the DMRS ports 0 and 1 corresponding to CDM group 0 are mapped on RE #0 and RE #2, the DMRS ports 2 and 3 corresponding to CDM group 1 are mapped on RE #1 and RE #3, the DMRS ports 4 and 5 corresponding to CDM group 2 are mapped on RE #4 and RE #6, the DMRS ports 6 and 7 corresponding to CDM group 3 are mapped on RE #5 and RE #7, the DMRS ports 8 and 9 corresponding to CDM group 4 are mapped on RE #8 and RE #10, and the DMRS ports 10 and 11 corresponding to CDM group 5 are mapped on RE #9 and RE #11.

Figure 5B:
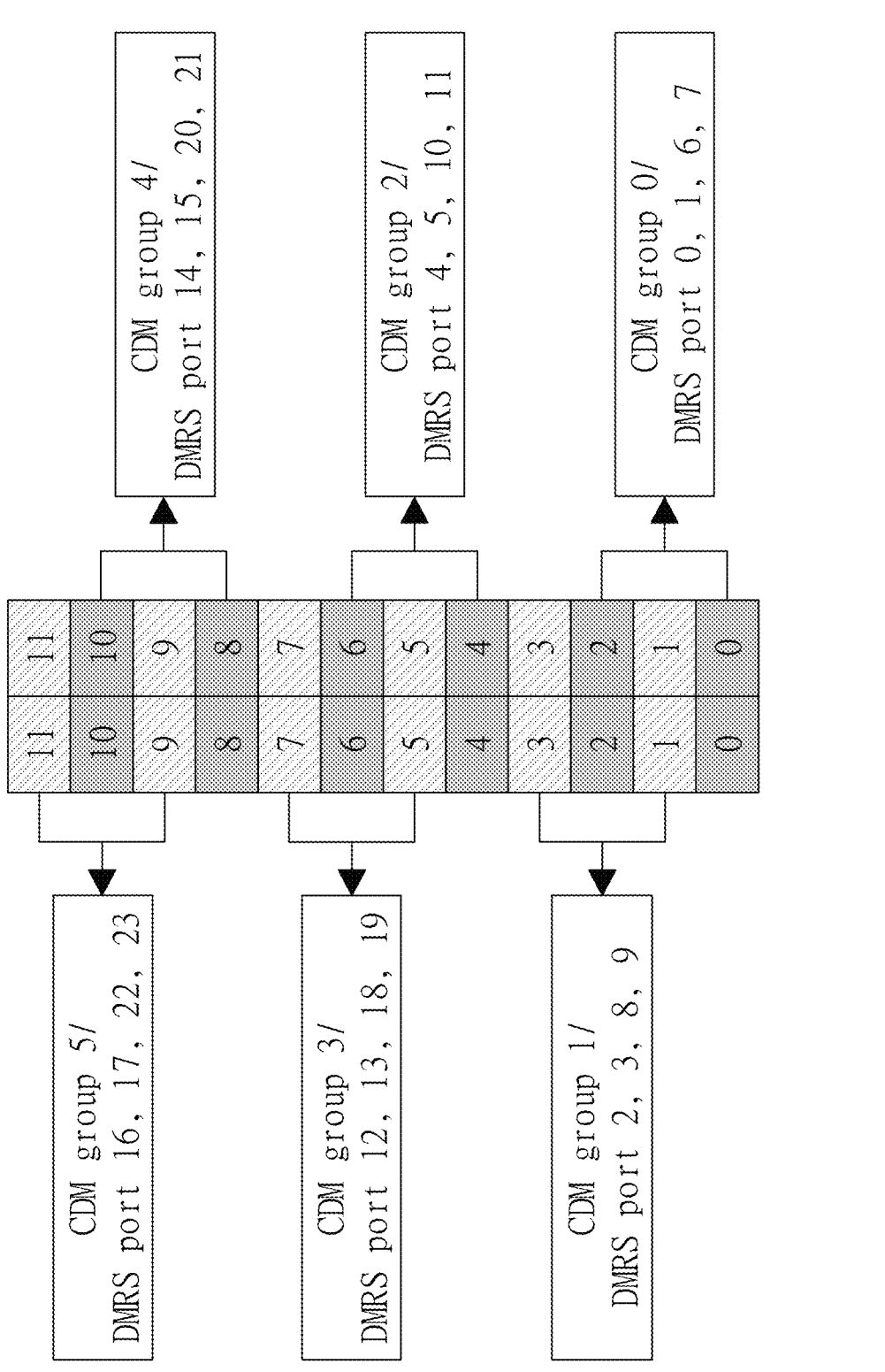
FIG. 5B shows an example of a DMRS pattern for DMRS type 1 of one PRB in the case of two front loaded DMRS symbols based on some implementations of the disclosed technology.

FIG. 5B shows an example of a DMRS pattern for DMRS type 1 of one PRB in the case of two front loaded DMRS symbols based on some implementations of the disclosed technology. In FIG. 5B, the DMRS ports 0, 1, 6 and 7 corresponding to CDM group 0 are mapped on RE #0 and RE #2, the DMRS ports 2, 3, 8 and 9 corresponding to CDM group 1 are mapped on RE #1 and RE #3, the DMRS ports 4, 5, 10 and 11 corresponding to CDM group 2 are mapped on RE #4 and RE #6, the DMRS ports 12, 13, 18 and 19 corresponding to CDM group 3 are mapped on RE #5 and RE #7, the DMRS ports 14, 15, 20 and 21 corresponding to CDM group 4 are mapped on RE #8 and RE #10, and the DMRS ports 16, 17, 22 and 23 corresponding to CDM group 5 are mapped on RE #9 and RE #11.

The following equations are introduced to support the DMRS patterns, for example, as shown in FIGS. 4A to 5B. The equation of the DMRS mapping is derived using equation (1-1):

$$a_{k,l}^{(p,\mu)} = w_f(k')w_t(l')r(2*n+k') \qquad (1\text{-}1)$$

$$k = \begin{cases} 12*n+2*k'+\Delta, & \text{configuration type I} \\ 12*n+k'+\Delta, & \text{configuration type II} \end{cases}$$

$$k' = 0, 1;$$

$$l = \bar{l}+l'$$

$$n = 0, 1 \ldots$$

$$j = 0, 1, \ldots, v-1$$

The parameters in equation (1-1) indicate the frequency domain and time domain resources. The parameters, $w_f(k')$ and $w_f(l')$, are the OCC in the frequency domain and time domain. The parameter, $r(2n+k')$, is the sequence of the DMRS port. The DMRS ports in one CDM group on different REs are different. The parameter k indicates different REs mapped on one DMRS port. In the following additional equations, the same variables as those used in the equation (1-1) represent the same parameters as disused for the equation (1-1).

For some CDM groups of the newly configured UE, the sequence of DMRS port may need to be modified. For example, for the CDM groups #0 and #1, the newly configured UE will use orthogonal sequences according to the current specification because the CDM groups #0 and #1 are mapped on the same REs as those assigned to the CDM groups #0 and #1 of the legacy UE. However, some CDM groups of the newly configured UE need to have modified sequences instead of using the sequences according to the current specification. This is because when the legacy UE and the newly configured UE are co-scheduled, some CDM groups of the newly configured UE will be mapped on some of the REs that are also assigned to the legacy UE CDM groups. For the example of the DMRS type 2, the CDM group #0 of the legacy UE will be mapped on REs #0, #1, #6, #7, and the CDM group #3 of the newly configured UE will be mapped on REs #6 and #7. Thus, the REs mapped on the CDM group #3 of the newly configured UE and CDM group #0 of the legacy UE are mapped on the REs that have same indices. For the example of the DMRS type 1, legacy UE of CDM group 0 will be mapped on REs #0, #2, #4, #6, #8, #10, and the CDM group 2 of newly configured UE will be mapped on REs #4 and #6. Thus, if the sequence of DMRS port is not modified, the legacy UE and newly configured UE will not have the orthogonal sequences and cause interferences to the legacy UE.

The following equations (1-2) and (1-3) are suggested to address the issues for the CDM groups #2 and #3.

The sequence of DMRS port, r(n), can be calculated as equation (1-2):

$$r(n) = \frac{1}{\sqrt{2}}(1 - 2\cdot c(2n)) + j\frac{1}{\sqrt{2}}(1 - 2\cdot c(2n+1)) \qquad (1\text{-}2)$$

The sequence of c(n) can be calculated as equation (1-3):

$$c_{init} = \qquad (1\text{-}3)$$

$$\left( 2^{17} \left( N_{symb}^{slot} n_{s,f}^{\mu} + l + 1 \right) \left( 2N_{ID}^{\bar{n}_{SCID}} + 1 \right) + 2^{17} \left\lfloor \frac{\bar{\lambda}}{2} \right\rfloor + 2N_{ID}^{\bar{n}_{SCID}} + \bar{n}_{SCID} \right)$$

$$\mod 2^{31}$$

$$\bar{\lambda} = \begin{cases} \lambda \bmod 2, & \text{configure } typeI \\ \lambda \bmod 3, & \text{configure } typeII \end{cases}$$

In equations (1-2) and (1-3) above, the CDM groups #2 and #3 are of DMRS type 1 and the CDM groups #3, #4, and #5 are of DMRS type 2. The sequence of DMRS port is associated with a max number of CDM groups for each configuration DMRS type. According to equations (1-2) and (1-3), the legacy UE with up to 12 DMRS ports and the newly configured UE with up to 24 DMRS have the orthogonal sequence one the same RE.

In some implementations, the equation (1-1) can be modified as follows:

$$a_{k,l}^{(p,\mu)} = w_f(k')w_t(l')r(k) \tag{1-4}$$

$$k = \begin{cases} 12*n + 2*k' + \Delta, & \text{configuration type I} \\ 12*n + k' + \Delta, & \text{configuration type II} \end{cases}$$

$$k' = 0, 1;$$

$$l = \bar{l} + l'$$

$$n = 0, 1 \ldots$$

$$j = 0, 1, \ldots, v - 1$$

In equation (1-4), the sequence is different on every RE. The sequence of the newly configured DMRS ports is also orthogonal with the legacy UE on the same RE.

In some implementations, the DMRS can be mapped based on equation (1-5).

$$a_{k,l}^{(p,\mu)} = w_f(k')w_t(l')r(a*n + k' + b) \tag{1-5}$$

$$k = \begin{cases} 12*n + 2*k' + \Delta, & \text{configuration type I} \\ 12*n + k' + \Delta, & \text{configuration type II} \end{cases}$$

$$k' = 0, 1;$$

$$l = \bar{l} + l'$$

$$n = 0, 1 \ldots$$

$$j = 0, 1, \ldots, v - 1$$

$$a = \begin{cases} 6, & \text{configuration type I} \\ 4, & \text{configuration type II} \end{cases}$$

$$b = \begin{cases} 2*\left\lfloor \dfrac{\Delta}{4} \right\rfloor, & \text{configuration type I} \\ 2*\left\lfloor \dfrac{\Delta}{6} \right\rfloor, & \text{configuration type II} \end{cases}$$

Equation (1-3) is suitable when the legacy UE and the newly configured UE are co-scheduled in some CDM groups. As an example, a case when the legacy UE and the newly configured UE are scheduled in the CDM group #0 and the CDM group #3 for DMRS type 2 (single symbol) is discussed. In this case, the CDM group #3 is indicated for the newly configured UE (e.g., DMRS port #13) and the CDM group #0 is indicated for both the newly configured UE (e.g., DMRS port #1) and the legacy UE (e.g., DMRS port #0). Thus, DMRS ports #0, #1, and #13 can be co-scheduled, where the DMRS ports #1 and #13 are of the newly configured UE and the DMRS port #0 is of the legacy UE. Otherwise, the interference in the CDM group #0 and the CDM group #3 will be difficult to be estimated for the legacy UE. For example, if only DMRs port #1 is configured or indicated to the newly configured UE, other REs, which correspond to the DMRS port #0 and #13, will not be used for DMRS mapping, and the legacy UE will detect interference on the REs where the CDM group that legacy UE is indicated, so two REs (where DMRS port 13 is mapped but actually is not indicated) will also be treated as DMRS mapped, so the interference estimated by the legacy UE will actually from DMRS port 1 and data (or blank), while the legacy UE treat all the REs are mapped with DMRS, so the interference is hard to be estimated for the legacy UE.

When DMRS ports #1 and #13 are allocated for the newly configured UE, the newly configured UE will average interference of DMRS ports #1and #13 instead of summing interference of DMRS ports #1 and #13. In some implementations, however, the newly configured UE needs to sum interference on DMRS port #1 and DMRS port #13.

While up to 6 CDM groups are supported, the CDM groups #0 and #3 (referred to as "the CDM group (0, 3)") of the newly configured UE are mapped on the same REs of the legacy UE CDM group #0, the CDM groups #1 and #4 (referred to as "the CDM group (1, 4)") of the newly configured UE are mapped on the same REs of the legacy UE CDM groups #1, and the CDM groups #2 and #5 (referred to as "the CDM group (2, 5)") of the newly configured UE are mapped on the same REs of the legacy UE CDM groups 2. For example, the CDM group #0 of the newly configured UE is mapped on REs #0 and #1 and the CDM group #3 of the newly configured UE is mapped on REs #6 and #7 (see FIG. 4A). The REs #0, #1, #6 and #7 are same REs of the legacy UE CDM group #0 (see FIG. 1). If DMRS of legacy UE and DMRS of newly configured UE can be in different CDM groups, the legacy UE will average interference on CDM group (0,3)/(1,4)/(2,5) of the new UE, although the interferences on CDM group #0 and CDM group #3 need to be added. The same applied for the CDM group (1,4)/(2,5). In additional, the offset between DMRS and PDSCH are different for the legacy DMRS port and newly configured DMRS port.

In the example as shown in FIGS. 4A to 5B, DMRS port 0 is mapped on RE #0 and RE #1. Different parameters indicate different sequence in equation (1-1) as r(0) and r(1).

Implementation 2-1

Figure 6:
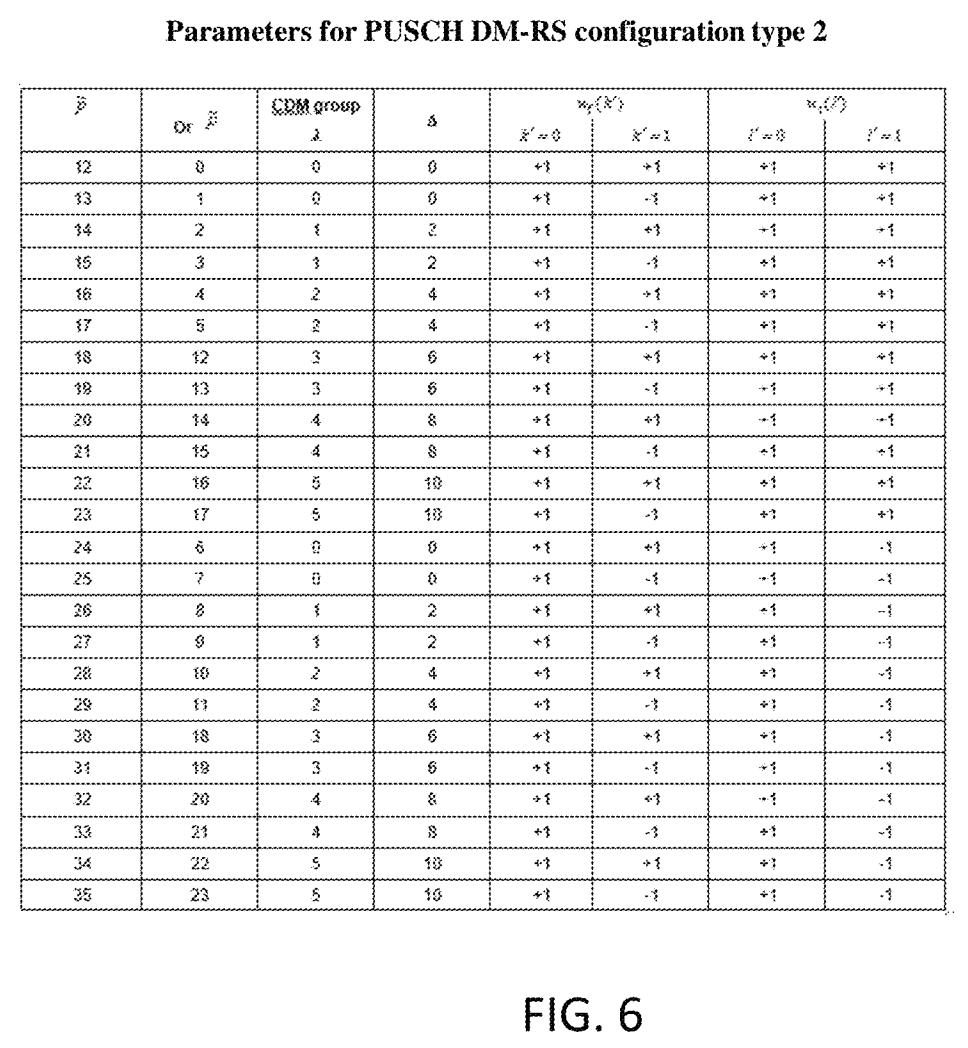

This implementation discusses parameters and DMRS port indices for DMRS type 2. For the DMRS ports, the network (e.g., gNB) may give an indication to UE of which DMRS port is used for the transmission, and UE can figure out DMRs port index from the indication. As shown in FIG. 6, UE also can know the parameters associated to the indicated DMRS port and thus know the sequence according to the parameters.

FIG. 6 shows an example of a table including parameters for PUSCH DMRS configuration type 2 based on some implementations of the disclosed technology. The parameters in FIG. 6 correspond to the parameters in equation (1-1) and provide OCC information. The first and second columns of the table as shown in FIG. 6 show the DMRS port indices. In FIG. 6, the DMRS port index is marked with a value in a range between 12 and 35 which corresponds to the double symbol DMRS. In the case of the single symbol DMRS, the DMRS port index can be marked with a value in a range between 12 and 23. The two possible sets of the DMRS port indices are shown as examples but other implementations are also possible.

For the calculation of parameter k, k indicates RE(s) on one PRB. If n=0, the k is one value of 0 to 11. If n is greater than 0 (i.e., n>0), the k can be value of other PRBs, because 12 REs are contained in one PRB. In FIG. 6, the parameter $\Delta$ is different for different CDM groups and k' indicates different REs in one CDM group. If n=0, the parameter k can be calculated as 0 and 1 for DMRS port 0 of DMRS type 2, and the parameter k can be calculated as 0 and 2 for DMRS port 0 for DMRS type 1.

FIG. 7 shows an example of DMRS port indices for DMRS type 2 based on some implementations of the disclosed technology. In FIG. 7, the DMRS port index is marked with a value in a range between 12 and 35 which corresponds to the double symbol DMRS. In the case of the single symbol DMRS, the DMRS port index can be marked with a value in a range between 12-23. If the DMRS is indicated with indices 12-35, the DMRS pattern is for a newly configured UE, and UE would know that the new DMRS pattern is to be mapped. If the DMRS is indicated from index 0-11, the DMRS is for a legacy UE, and UE would know that the legacy DMRS pattern is to be mapped. Thus, the DMRS port index can be used to indicate whether the DMRS is new DMRS pattern or legacy DMRS pattern.

Implementation 2-2

This implementation discusses parameters and DMRS port indices for DMRS type 1.

Figure 8:
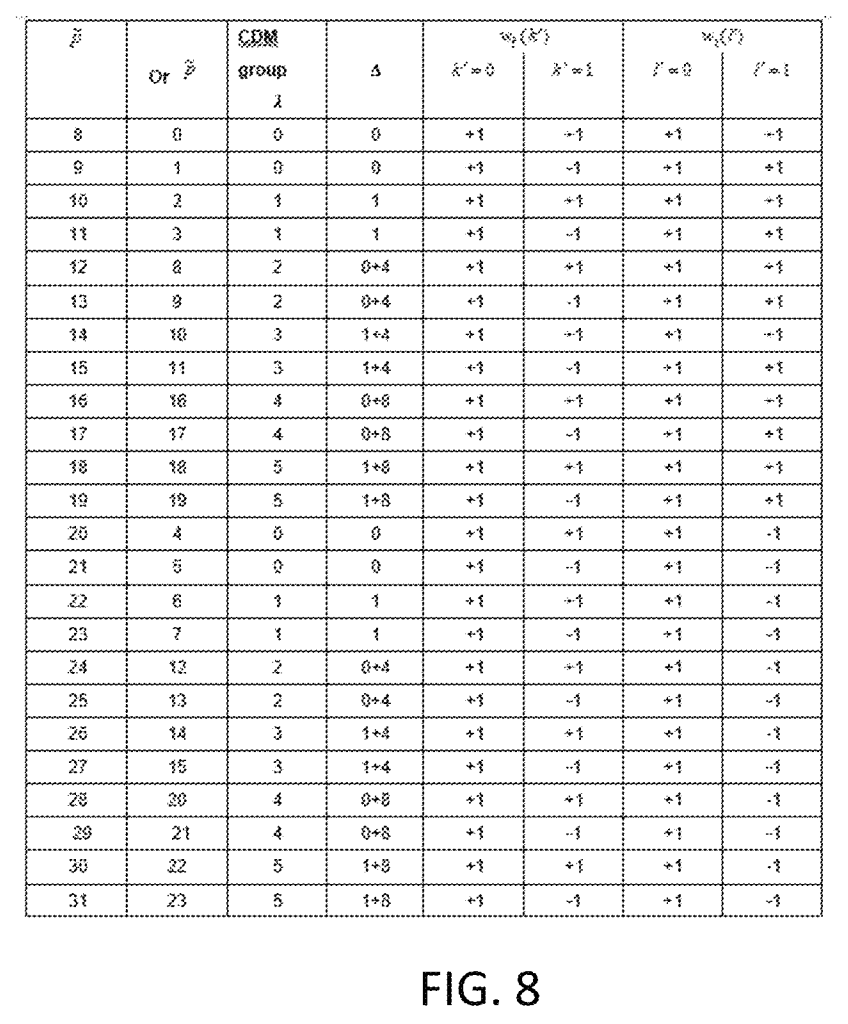
Figure 9:
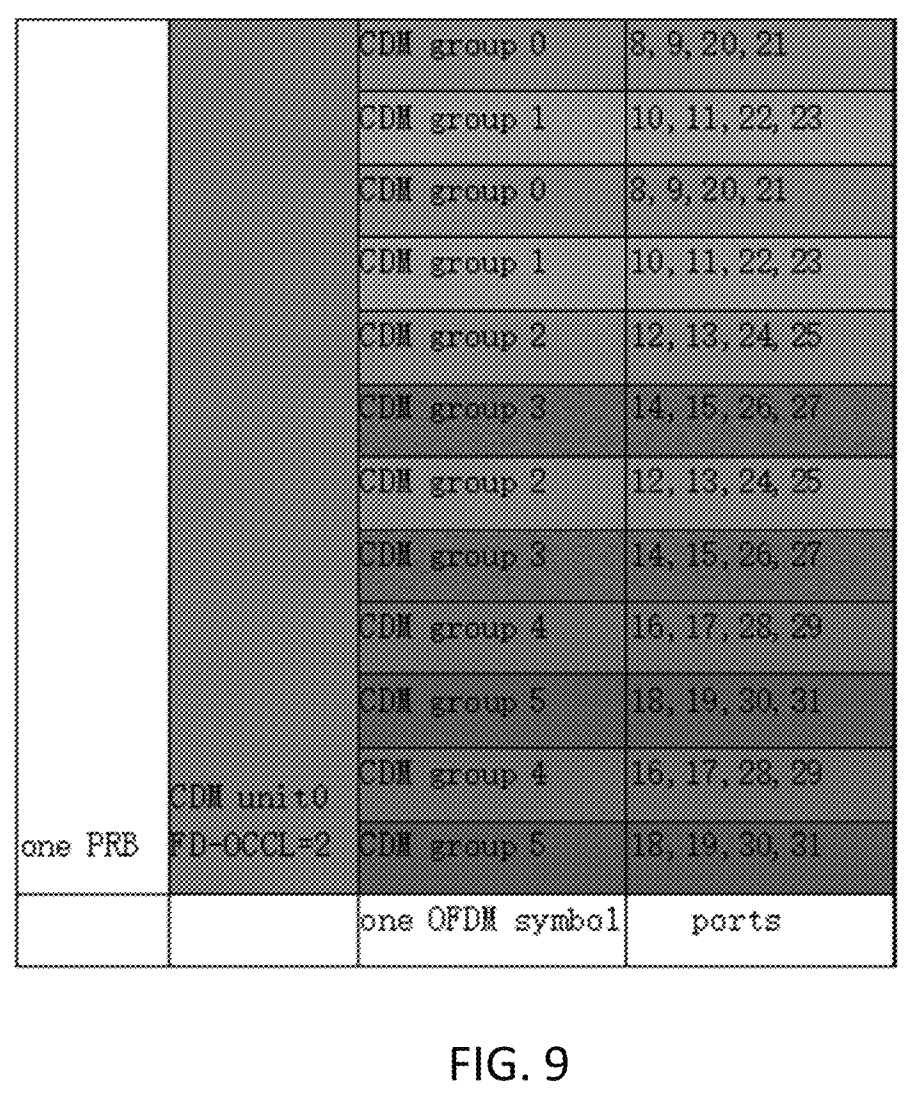

FIG. 8 shows an example of a table including parameters for PUSCH DMRS configuration type 1 based on some implementations of the disclosed technology. The parameters in FIG. 8 correspond to the parameters in equation (1-1) and provide OCC information. FIG. 9 shows an example of DMRS port indices for DMRS type 1 based on some implementations of the disclosed technology. In FIGS. 8 and 9, the DMRS port index can be marked as 8-19 for single symbol DMRS and 8-31 for double symbol DMRS. If the DMRS is indicated with indices 8-31, the DMRS pattern is for a newly configured UE, and UE would know that the new DMRS pattern is to be mapped. If the DMRS is indicated from index 0-7, the DMRS is for a legacy UE, and UE would know that the legacy DMRS pattern is to be mapped. Thus, the DMRS port index can be used to indicate whether the DMRS is new DMRS pattern or legacy DMRS pattern.

Implementation 3

This implementation discusses signaling a downlink control information (DCI) to indicate the DMRS port information including at least one of newly configured DMRS ports and the legacy DMRS ports. Each value of the signaling may indicate a number of CDM group without data and also the related DMRS ports. In some implementations, the number of DMRS CDM groups without data can be used to indicate the DMRS ports.

Based on the implementations of the disclosed technology, each DMRS port is mapped on 2 REs on one PRB of one symbol in one CDM group. Thus, up to 6 CDM groups are supported on one PRB. The CDM group without data can be supported up to 6.

In some implementations, when one PRB supports three to six CDM groups, i.e., the number of CDM groups supported on one PRB are three to six, the candidate number of the CDM group without data can be enhanced from the set {1,2,3} to {1,2,3,4,5,6}. The set {1, 2, 3} corresponds to the legacy set. The set {1,2,3,4,5,6} corresponds to CDM group 0, (0,1), (0,1,2), (0,1,2,3), (0,1,2,3,4), (0,1,2,3,4,5).

The number of the CDM group without data can be enhanced by one of following options:

Option 1: Option 1 uses the DMRS port index to indicate whether a DMRS port is a newly configured DMRS port or a legacy DMRS port. FIG. 10 illustrates an example of a table showing a number of DMRS CDM groups without data for DMRS type 2 for single symbol DMRS. In FIG. 10, the column 'value' from 0 to 31 corresponds to an entry of DCI signaling from the network side (e.g., gNB) to indicate, to the UE, which DMRS port is used. In FIG. 10, rank is 2 for new CDM group. As shown in FIG. 10, the DMRS ports of the legacy UE have indices greater than 11. If the indicated DMRS port has an index number between 0 and 11, the DMRS port corresponds to the legacy DMRS port. Thus, the DMRS port index can indicate whether the CDM group is mapped to 2 REs or not. If the indicated DMRS port has an index number between 0 and 11, the newly configured CDM groups #0 to #2 correspond to the legacy UE CDM groups #0 to #2. If the indicated DMRS port has an index number between 12 and 35, the CDM groups #0 to #2 correspond to the newly configured CDM groups #0 to 2, each CDM group with 2 REs per PRB. Thus, the DMRS port index can indicate whether the CDM group is mapped to 2 REs or not.

Option 2: Option 2 uses different indices for the number of DMRS CDM groups without data for the newly configured DMRS port and the legacy DMRS port. FIG. 11 illustrates an example of a table showing a number of DMRS CDM groups without data for DMRS type 2 for single symbol DMRS. In FIG. 11, rank is 2 for a new CDM group and a legacy CDM group. For the number of CDM groups 1 to 3, especially for legacy DMRS port, it needs to be clarified whether it is mapped on a new CDM group or legacy CDM group. Such information can be configured by RRC or indicated by DCI. The number of CDM group without data {1,2,3,1',2',3',4,5,6} corresponds to CDM group 0, (0,1), (0,1,2), 0', (0',1'), (0',1',2'), (0,1,2,3), (0,1,2,3,4), (0,1,2,3,4,5), respectively. The CDM group indices 0-5 is for new CDM group, and index 0',1',2' is for legacy UE. For example, as shown in FIG. 11, the number of DMRS CDM groups without date can be used to indicate whether the DMRS port is legacy DMRS port or new DMRS port.

Option 3: One bit in RRC or MAC CE or DCI can be used to indicate whether the DMRS port is a newly configured DMRS port or legacy DMRS port (i.e., mapped on 4 REs or 2 REs on one PRB of one OFDM symbol). If this bit is configured or activated or indicated, the DMRS ports are newly configured DMRS port, otherwise the DMRS port is the legacy DMRS port.

Implementation 4

This implementation discusses the ratio of PDSCH EPRE to DMRS EPRE based on number of DMRS CDM groups without data. The ratio between DMRS and PDSCH is associated with the number of CDM groups without data because all the DMRS layers are transmitted in REs corresponding to CDM without data but all the data layers are transmitted in each RE of data mapped.

FIG. 12 illustrates an example of a table showing a ratio of PDSCH EPRE to DM-RS EPRE. For example, if the DMRS CDM group number without data is 4, the energy of DMRS on one RE is 4 times of PDSCH corresponding to this DMRS port on one RE, so the EPRE of PDSCH to DMRS EPRE is −6 dB.

For the legacy UE, it is assumed that ratio between DMRS and PDSCH is 1 to 3, because up to 3 CDM groups without data is supported. For the newly configured UE, it is assumed that the ratio between DMRS and PDSCH is 1 to 6 because up to 6 CDM groups without data is supported.

When the legacy UE is co-scheduled with newly configured UE (e.g., the legacy UE is indicated with CDM group 0, and the newly configured UE is indicated with CDM group 1), the DMRS port for the legacy UE can be mapped on 4 REs on one PRB of one OFDM symbol, and the DMRS port for the newly configured UE can be mapped on 2 REs on one PRB of one OFDM symbol. Thus, if the DMRS ports of the legacy UE and the newly configured UE are co-scheduled, and each DMRS port is transmitted with the same energy on one RE, the PDSCH power of the legacy UE and newly configured UE are same on one RE.

If the newly configured UE is co-scheduled with the legacy UE, the ratio of EPRE of PDSCH and DMRS can be indicated according to the table as shown in FIG. 12 The ratio of EPRE of PDSCH and DMRS of the legacy UE is indicated using the number of DMRS CDM groups without data, which is between 1 to 3, and the ratio of EPRE of PDSCH and DMRS of the newly configured UE is indicated using the number of DMRS CDMP groups without data, which is between 4 to 6. Thus, based on the number of the CDM groups without data, whether the EPRE is of the legacy UE or the newly configured UE can be indicated. For example, if the number of CDM groups without data is 1 to 3, the EPRE is considered from the legacy UE. If the number of CDM groups without data is 1 to 6, the EPRE is considered from the newly configured UE.

When the newly configured UE can be co-scheduled with the legacy UE, the DMRS port of the newly configured UE cannot be mapped on the REs which are mapped to the DMRS port of the legacy UE. For example, if the legacy UE is indicated with DMRS port 0 for DMRS type 1, which is mapped on the CDM group #0 to which 6 REs on one PRB of one OFDM symbol, i.e. RE #0, 2, 4, 6, 8, 10 are assigned, the DMRS ports of the newly configured UE cannot be mapped on those REs, i.e., RE #0, #2, #4, #6, #8, #10. Thus, the CDM groups #0, #2, and #4 cannot be co-scheduled with the DMRS CDM group #0 of the legacy UE. For DMRS type 2, four REs are used to map one DMRS port, and thus the CDM groups #0 and #3 cannot be co-scheduled with the DMRS CDM group #0 of the legacy UE. The DMRS port of the newly configured UE needs to be indicated according to the legacy rule. For example, if the legacy UE is indicated with the CDM group #0, the newly configured UE cannot be indicated with CDM group #0 or #3 for DMRS type 2. If the DMRS of the legacy UE and newly configured UE are mapped on non-overlapping REs, the DMRS port of the newly configured UE cannot be mapped on the two CDM groups simultaneously on the same REs associated with one legacy DMRS CDM group. The EPRE of newly configured UE is calculated associated with a double number of legacy DMRS CDM group without data. If the legacy CDM group #0 is allocated to the legacy UE, the new CDM group #1, #2, #4, and #5 are allocated to the newly configured UE, in this case, the CDM group without date is 3 for the legacy UE and 6 for the newly configured UE In the case of partial overlapped REs between legacy UE and new UE in one CDM group, e.g. the legacy UE and new UE are co-scheduled in one CDM group, e.g. CDM group #0 for DMRS type 2, 4 REs are used for mapping CDM group 0 of legacy UE, and 2 REs for new UE, if the CDM numbers without data are both 1 for legacy UE and new UE, the EPRE are both 0 dB.

In some implementations, the ratio between DMRS and PDSCH is 3 for the legacy UE and the ratio between DMRS and PDSCH is 6 for the newly configured UE.

If the legacy UE and the newly configured UE are co-scheduled with different CDM groups, the EPRE for the newly configured UE and the legacy UE are calculated separately. For example, the EPRE for the legacy UE is calculate based on the legacy rules and the EPRE of newly configured UE is calculated based on new rules, while the CDM groups without data of newly configured UE need to be considered. When calculating the EPRE for the newly configured UE and the legacy UE, some adjustments need to be made since the number of REs in one CDM groups are different for the legacy UE and the newly configured UE. One CDM group for the legacy UE is mapped on at least 4 REs and one CDM group for the newly configured UE is mapped on 2 REs Thus, the number of the CDM groups for the legacy UE is counted by multiplying two when calculating the EPRE for the newly configured UE. For example, when one CDM group for the legacy UE is co-scheduled with one or more CDM groups for the newly configured UE, one CDM group for the legacy UE (corresponding to total 4 REs for one CDM group) is counted as two for calculating the EPRE for the newly configured UE. In addition, the number of the CDM groups for the newly configured UE is counted by multiplying half when calculating the EPRE for the legacy UE. For example, when two CDM groups for the newly configured UE is co-scheduled with one or more CDM groups for the legacy UE, two CDM groups for the newly configured UE (corresponding to total 4 REs for the two CDM groups) are counted as one for calculating the EPRE for the legacy UE.

If the newly configured UE is co-scheduled with newly configured UE only, and the legacy UE is co-scheduled with the legacy UE only, the ratio of EPRE of PDSCH and DMRS can be used separately for the newly configured UE and the legacy UE. For example, the EPRE for the legacy UE is calculate based on the legacy rules and the EPRE of newly configured UE is calculated based on new rules.

Implementation 5

FIG. 13 shows an example of a TDM based DMRS configuration based on some implementations of the disclosed technology. For the single symbol DMRS type 1 two CDM groups are supported on one OFDM symbol, and two more CDM groups are supported on another OFDM symbol. For the double symbol DMRS type 1 and the double symbol DMRS type 2, two CDM groups can be mapped on two continuous OFDM symbols and other two CDM groups are mapped on other two continuous OFDM symbols.

If the TDM based DMRS are configured by RRC or indicated by DCI, the number of OFDM symbols for DMRS needs to be limited as an even number.

The ratio between DMRS and PDSCH is 2 times the number of CDM group without data if 1) the number of without data includes CDM group #3 or #4 or 2) the TDM based DMRS is configured by RRC or indicated by DCI. All layers are transmitted on 2*the number of CDM groups without data.

The DMRS of the newly configured UE and the legacy UE is not mapped on the same REs or the same CDM groups. Thus, the DMRS of the newly configured UE and the legacy UE can be mapped on the different REs or the different CDM groups. For example, the CDM group #0 and the CDM group #3 can be allocated to the legacy UE, while the CDM group #1 and the CDM group #4 can be allocated to new UE.

Figure 14:
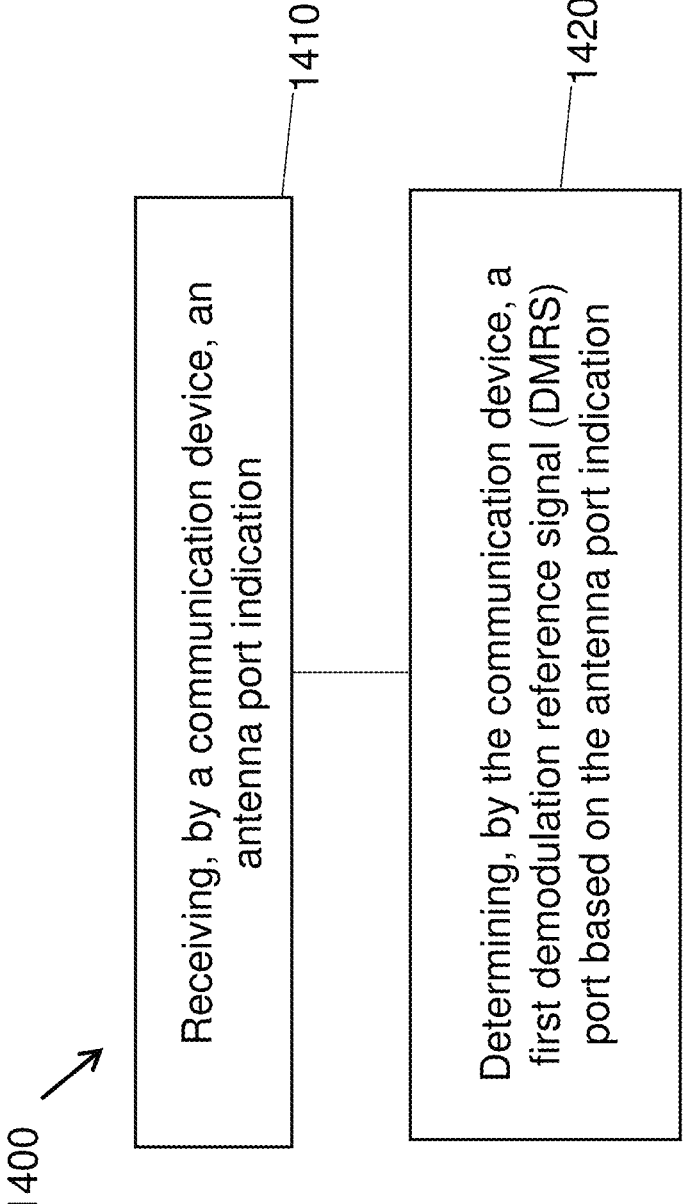
FIGS. 14 and 15 illustrate flowcharts showing an example method of wireless communication based on some implementations of the disclosed technology.

FIG. 14 illustrates a flowchart showing another example method of wireless communication based on some implementations of the disclosed technology. The method 1400 includes, at the operation 1410, receiving, by a communication device, an antenna port indication. The method 1400 further includes, at the operation 1420, determining, by the communication device, a first demodulation reference signal (DMRS) port based on the antenna port indication. In some implementations, the first DMRS port is mapped to two resource elements of one physical resource block on one OFDM (Orthogonal Frequency Division Multiplexing) symbol.

In some implementations, the first DMRS port is mapped on the two resource elements and the two resource elements are at least one of: 1) continuous in frequency domain for DMRS type 2, or 2) comb in frequency domain for DMRS type 1. In some implementations, the antenna port indication includes at least one of an antenna port index, a number of Code Division Multiplexing (CDM) group without data, or an index of CDM group without data. In some implementations, the antenna port indication indicates whether a DMRS port is mapped on the two resource elements or more than two resource elements on the physical resource block on the OFDM (Orthogonal Frequency Division Multiplexing) symbol. In some implementations, the antenna port indication is indicated using a radio resource control (RRC) signaling or a MAC control element, or a downlink control information. In some implementations, the antenna port index has a value in a range specific for the communication device configured according to the antenna port configuration, the range being different from that for another communication device configured according to a legacy configuration. In some implementations, the first DMRS port is scheduled with at least one of: 1) an additional first DMRS port; 2) a second DMRS port mapped on at least four resource elements on the physical resource block of the OFDM symbol, wherein the at least four resource elements are overlapping with the two resource elements to which the first DMRS port maps; or 3) a second DMRS port mapped on resource elements non-overlapping with the two resource elements of the first DMRS port. In some implementations, a CDM group of the second DMRS port is scheduled on resource elements overlapping with at least one of: 1) three CDM groups of the first DMRS port for DMRS type 1, or 2) two CDM groups of the first DMRS port for DMRS type 2. In some implementations, the first DMRS port has a sequence associated with at least one of a max number of CDM groups based on whether the first DMRS port corresponds to DMRS type 1 or DMRS type 2, or an index of a resource element. In some implementations, a number of a CDM group without data is between 1 to 6. In some implementations, the method further comprises: calculating energy per resource element (EPRE) at least one of DMRS, a physical downlink shared channel (PDSCH), or a physical uplink shared channel (PUSCH) based on a number of CDM groups without data. In some implementations, the EPRE is calculated for the first DMRS port by multiplying two times of a number of CDM groups without data of a second DMRS port mapped to more than two resource elements of the physical resource block on the OFDM symbol. In some implementations, the method further comprises: receiving or transmitting the one or more demodulation reference signals based on the determined antenna port configuration.

Figure 15:
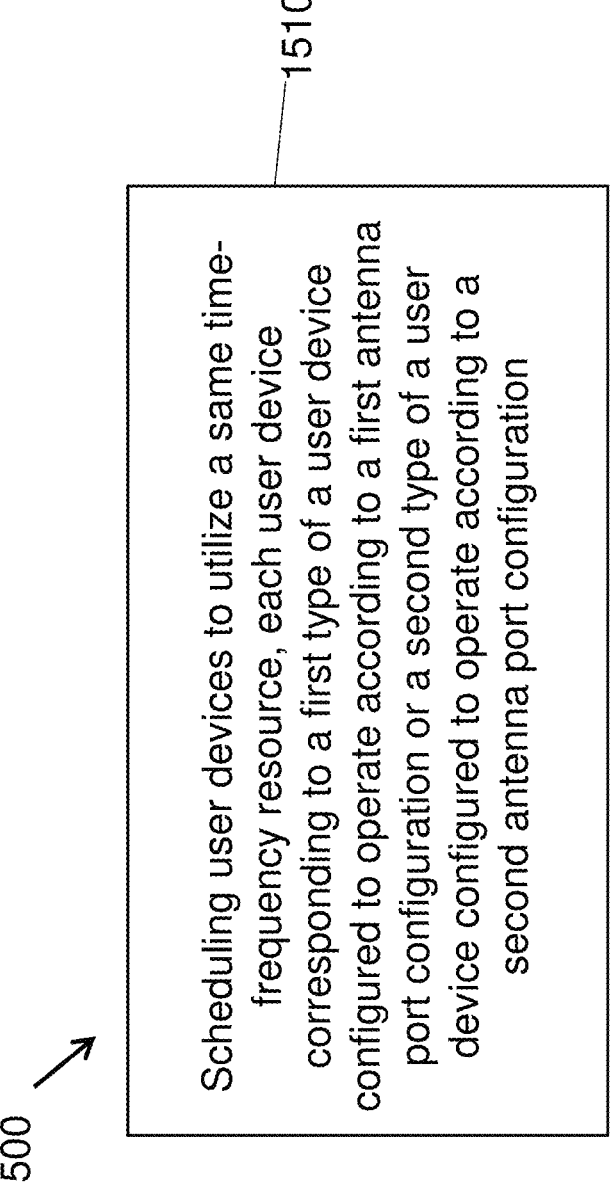

FIG. 15 illustrates a flowchart showing another example method of wireless communication based on some implementations of the disclosed technology. The method 1500 includes, at the operation 1510, scheduling user devices to utilize a same time-frequency resource, each user device corresponding to a first type of a user device configured to operate according to a first antenna port configuration or a second type of a user device configured to operate according to a second antenna port configuration. The first antenna port configuration maps an antenna port for one or more demodulation reference signals (DMRSs) to two resource elements of a physical resource block on a symbol and the second antenna port configuration maps the antenna port to at least 4 resource elements of the physical resource block on the symbol.

In some implementations, the user devices include the first type of the user device and the second type of the user device. In some implementations, the first type of the user device and the second type of the user device have a same DMRS pattern. In some implementations, the first type of the user device and the second type of the user device have antenna ports that are mapped on non-overlapping resource elements. In some implementations, the user devices include multiple second type of the user devices only or multiple first type of the user devices only. In some implementations, the method further comprises: transmitting, to the first type of the user device, a first antenna port indication having an antenna index whose value is in a first range not overlapping with the second range; and transmitting, to the second type of the user device, a second antenna port indication having an antenna index whose value is in a second range. In some implementations, the first antenna port indication includes at least one of an antenna port index, a number of CDM group without data, or an index of CDM group without data. In some implementations, the first antenna port indication is indicated using a radio resource control (RRC) signaling or a MAC control element, or a downlink control information.

Figure 16:
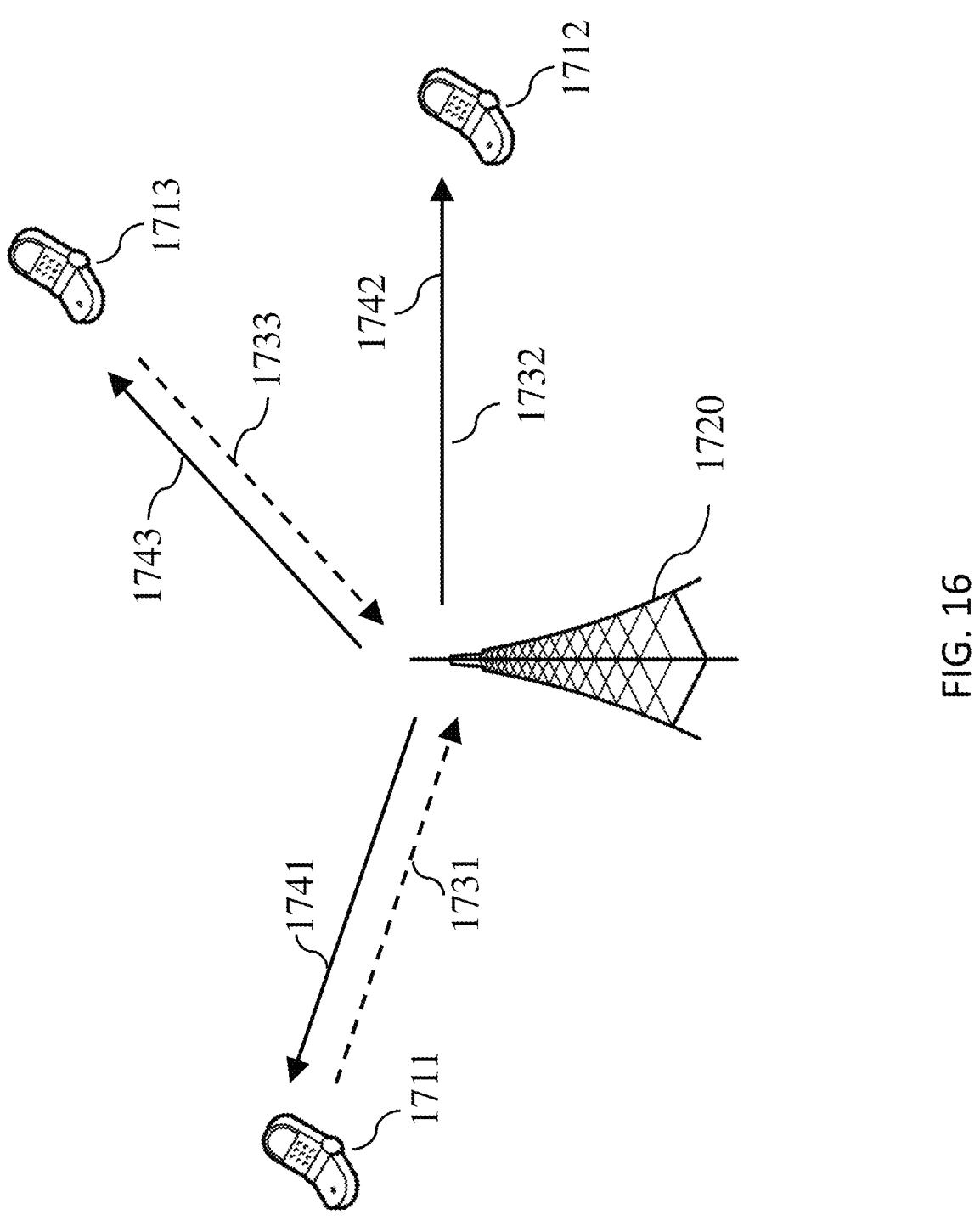
FIG. 16 shows an example of wireless communication including a base station (BS) and user equipment (UE) based on some implementations of the disclosed technology.

The implementations as discussed above will apply to a wireless communication. FIG. 16 shows an example of a wireless communication system (e.g., a 5G or NR cellular network) that includes a base station 1720 and one or more user equipment (UE) 1711, 1712 and 1713. In some embodiments, the UEs access the BS (e.g., the network) using implementations of the disclosed technology 1731, 1732, 1733), which then enables subsequent communication (1741, 1742, 1743) from the BS to the UEs. The UE may be, for example, a smartphone, a tablet, a mobile computer, a machine to machine (M2M) device, an Internet of Things (IoT) device, and so on.

Figure 17:
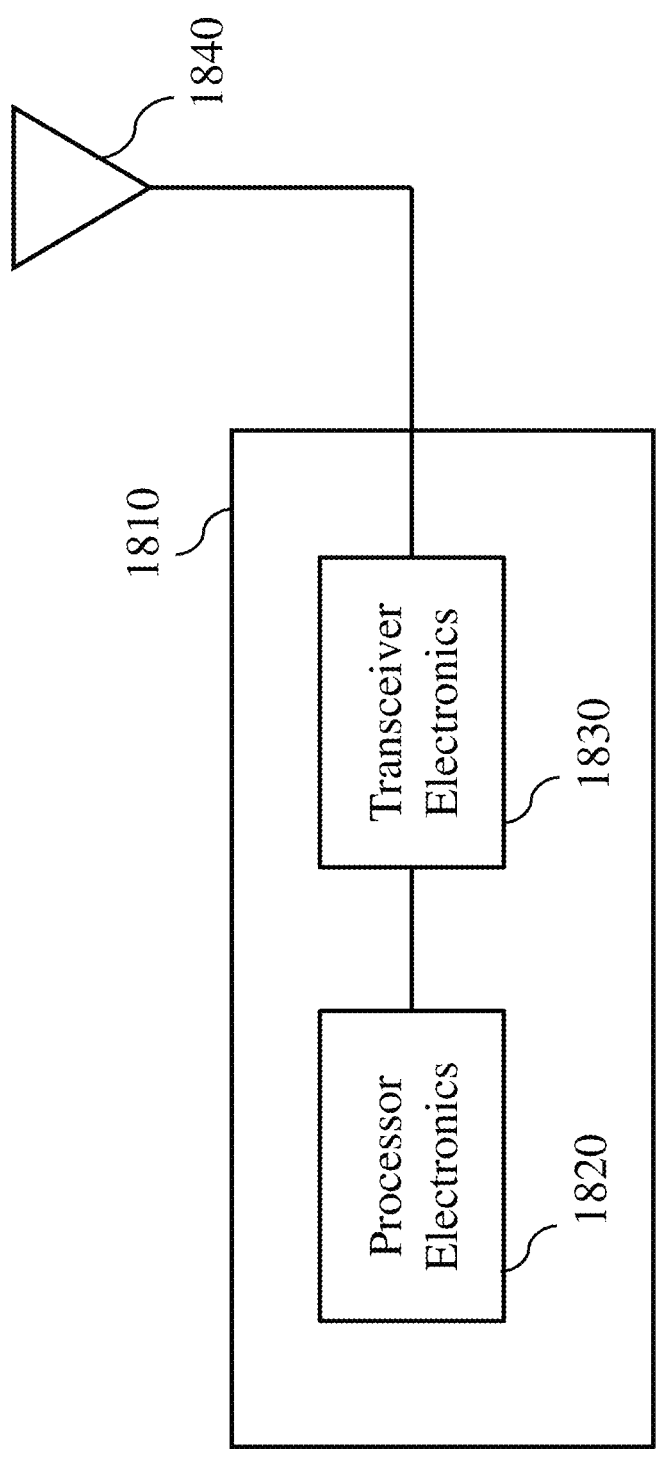
FIG. 17 shows an example of a block diagram of a portion of an apparatus based on some implementations of the disclosed technology.

FIG. 17 shows an example of a block diagram representation of a portion of an apparatus. An apparatus 1810 such as a base station or a user device which may be any wireless device (or UE) can include processor electronics 1820 such as a microprocessor that implements one or more of the techniques presented in this document. The apparatus 1810 can include transceiver electronics 1830 to send and/or receive wireless signals over one or more communication interfaces such as antenna 1840. The apparatus 1810 can include other communication interfaces for transmitting and receiving data. The apparatus 1810 can include one or more memories (not explicitly shown) configured to store information such as data and/or instructions. In some implementations, the processor electronics 1820 can include at least a portion of transceiver electronics 1830. In some embodiments, at least some of the disclosed techniques, modules or functions are implemented using the apparatus 1810.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
receiving, by a communication device, an antenna port indication indicating one from multiple demodulation reference signal (DMRS) port indications that include i) a first DMRS port indication corresponding to a first type of a user device configured to operate according to a first antenna port configuration, and ii) a second DMRS port indication corresponding to a second type of a user device configured to operate according to a second antenna port configuration, the communication device being either the first type of the user device or the second type of the user device; and
determining, by the communication device, a first demodulation reference signal (DMRS) port or a second DMRS port based on the antenna port indication, and
wherein the first DMRS port is mapped to two resource elements of one physical resource block on one OFDM (Orthogonal Frequency Division Multiplexing) symbol, and
wherein the second DMRS port is mapped to at least four resource elements of the physical resource block on the OFDM symbol.

2. The method of claim 1, wherein the two resource elements are at least one of: 1) continuous in frequency domain for DMRS type 2, or 2) comb in frequency domain for DMRS type 1.

3. The method of claim 1, wherein the antenna port indication includes at least one of an antenna port index, a number of Code Division Multiplexing (CDM) group without data, or an index of CDM group without data,
wherein the antenna port indication indicates whether a DMRS port is mapped on the two resource elements or more than two resource elements on the physical resource block on the OFDM (Orthogonal Frequency Division Multiplexing) symbol, and
wherein the antenna port index has a value in a range specific for the communication device configured according to an antenna port configuration, the range being different from that for another communication device configured according to a legacy configuration.

4. The method of claim 1, where the antenna port indication is indicated using a radio resource control (RRC) signaling or a MAC control element, or a downlink control information.

5. The method of claim 1, wherein the first DMRS port is determined by the first type of the user device and the first DMRS port is scheduled with at least one of:
1) an additional first DMRS port;
2) a second DMRS port mapped on at least four resource elements on the physical resource block of the OFDM symbol, wherein the at least four resource elements are overlapping with the two resource elements to which the first DMRS port maps, wherein a CDM group of the second DMRS port is scheduled on resource elements overlapping with at least one of: 1) three CDM groups of the first DMRS port for DMRS type 1, or 2) two CDM groups of the first DMRS port for DMRS type 2; or
3) a second DMRS port mapped on 4 resource elements non-overlapping with the two resource elements of the first DMRS port.

6. The method of claim 1, wherein the first DMRS port has a sequence associated with at least one of a max number of CDM groups based on whether the first DMRS port corresponds to DMRS type 1 or DMRS type 2, or an index of a resource element.

7. The method of claim 6, wherein the sequence is determined based on at least one of equations:

$$k = \begin{cases} 12*n + 2*k' + \Delta, & \text{configuration } DMRS \text{ type I} \\ 12*n + k' + \Delta, & \text{configuration } DMRS \text{ type II} \end{cases} \quad (1)$$

$$k' = 0.1;$$

$$n = 0, 1 \ \dots \ ;$$

17

-continued $$c_{init} = \left(2^{17}\left(N_{symb}^{slot}n_{s,f}^{\mu} + l + 1\right)\left(2N_{ID}^{\overline{n}_{SCID}} + 1\right) + 2^{17}\left\lfloor\frac{\overline{\lambda}}{2}\right\rfloor + 2N_{ID}^{\overline{\lambda}_{SCID}} + \overline{n}_{SCID}\right) \quad (2)$$

$$\mathrm{mod}\, 2^{31}$$

$$\overline{\lambda} = \begin{cases} \lambda\,\mathrm{mod}\,2, & \text{configure } typeI \\ \lambda\,\mathrm{mod}\,3, & \text{configure } typeII \end{cases}; \text{or}$$

$$r(a * n + k' + b) \quad (3)$$

$$k' = 0, 1;$$

$$n = 0, 1 \ldots$$

$$a = \begin{cases} 6, & \text{configuration type I} \\ 4, & \text{configuration type II} \end{cases}$$

$$b = \begin{cases} 2 * \left\lfloor\frac{\Delta}{4}\right\rfloor, & \text{configuration type I} \\ 2 * \left\lfloor\frac{\Delta}{6}\right\rfloor, & \text{configuration type II} \end{cases}$$

wherein r is a sequence of the first DMRS port, $c_{init}$ is an initial equation for calculation of r, k is an index of resource elements, a and b are associated with a max number of CDM groups based on a type of an antenna port, and $\lambda$ and $\Delta$ are associated to an index of a CDM group of the first DMRS port.

8. The method of claim 1, wherein a number of a CDM group without data is between 1 to 6.

9. The method of claim 1, further comprising:
calculating energy per resource element (EPRE) at least one of DMRS, a physical downlink shared channel (PDSCH), or a physical uplink shared channel (PUSCH) based on a number of CDM groups without data, and wherein the EPRE is calculated for the first DMRS port by multiplying two times of a number of CDM groups without data of a second DMRS port mapped to more than two resource elements of the physical resource block on the OFDM symbol.

10. The method of claim 1, further comprising:
receiving or transmitting one or more demodulation reference signals based on a determined antenna port configuration.

11. A method of wireless communication, comprising:
scheduling user devices to utilize a same time-frequency resource, each user device corresponding to a first type of a user device configured to operate according to a first antenna port configuration or a second type of a user device configured to operate according to a second antenna port configuration;
transmitting, to the first type of the user device, a first antenna port indication having an antenna index whose value is in a first range not overlapping with a second range; and
transmitting, to the second type of the user device, a second antenna port indication having an antenna index whose value is in the second range, and
wherein the first antenna port configuration maps an antenna port for one or more demodulation reference signals (DMRSs) to two resource elements of a physical resource block on a symbol and the second antenna port configuration maps the antenna port to at least 4 resource elements of the physical resource block on the symbol.

12. The method of claim 11,
wherein the first type of the user device and the second type of the user device have a same DMRS pattern, or have antenna ports that are mapped on non-overlapping resource elements.

13. The method of claim 11, wherein the user devices include multiple second type of the user devices only or multiple first type of the user devices only.

14. The method of claim 11, wherein the first antenna port indication includes at least one of an antenna port index, a number of CDM group without data, or an index of CDM group without data, or the first antenna port indication is indicated using a radio resource control (RRC) signaling or a MAC control element, or a downlink control information.

15. An apparatus for wireless communication comprising at least one processor and a memory, wherein the at least one processor is configured to read instructions from the memory and implement a method including:
receiving an antenna port indication indicating one from multiple demodulation reference signal (DMRS) port indications that include i) a first DMRS port indication corresponding to a first type of a user device configured to operate according to a first antenna port configuration and ii) a second DMRS port indication corresponding to a second type of a user device configured to operate according to a second antenna port configuration, the apparatus being either the first type of the user device or the second type of the user device; and
determining a first demodulation reference signal (DMRS) port or a second DMRS port based on the antenna port indication, and
wherein the first DMRS port is mapped to two resource elements of one physical resource block on one OFDM (Orthogonal Frequency Division Multiplexing) symbol, and
wherein the second DMRS port is mapped to at least four resource elements of the physical resource block on the OFDM symbol.

16. The apparatus of claim 15, wherein the antenna port indication includes at least one of an antenna port index, a number of Code Division Multiplexing (CDM) group without data, or an index of CDM group without data,
wherein the antenna port indication indicates whether a DMRS port is mapped on the two resource elements or more than two resource elements on the physical resource block on the OFDM (Orthogonal Frequency Division Multiplexing) symbol, and
wherein the antenna port index has a value in a range specific for the apparatus configured according to an antenna port configuration, the range being different from that for another communication device configured according to a legacy configuration.

17. The apparatus of claim 15, where the antenna port indication is indicated using a radio resource control (RRC) signaling or a MAC control element, or a downlink control information.

18. The apparatus of claim 15, wherein the two resource elements are at least one of: 1) continuous in frequency domain for DMRS type 2, or 2) comb in frequency domain for DMRS type 1, or wherein the first DMRS port has a sequence associated with at least one of a max number of CDM groups based on whether the first DMRS port corresponds to DMRS type 1 or DMRS type 2, or an index of a resource element.

19. The apparatus of claim 15, wherein the first DMRS port is determined by the first type of the user device and the first DMRS port is scheduled with at least one of:
1) An additional first DMRS port;
2) A second DMRS port mapped on at least four resource elements on the physical resource block of the OFDM symbol, wherein the at least four resource elements are overlapping with the two resource elements to which the first DMRS port maps, wherein a CDM group of the second DMRS port is scheduled on resource elements overlapping with at least one of: 1) three CDM groups of the first DMRS port for DMRS type 1, or 2) two CDM groups of the first DMRS port for DMRS type 2; or 3) A second DMRS port mapped on 4 resource elements non-overlapping with the two resource elements of the first DMRS port.

* * * * *